(12) United States Patent
Celo

(10) Patent No.: US 9,335,480 B1
(45) Date of Patent: May 10, 2016

(54) OPTICAL ALIGNMENT USING MULTIMODE EDGE COUPLERS

(71) Applicant: Huawei Technologies Co., Ltd., Shenzhen (CN)

(72) Inventor: Dritan Celo, Nepean (CA)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 14/660,061

(22) Filed: Mar. 17, 2015

(51) Int. Cl.
| | |
|---|---|
| *G02B 6/12* | (2006.01) |
| *G02B 6/26* | (2006.01) |
| *G02B 6/42* | (2006.01) |
| *G02B 6/30* | (2006.01) |
| *G02B 6/36* | (2006.01) |
| *G02B 6/293* | (2006.01) |
| *G02B 6/43* | (2006.01) |

(52) U.S. Cl.
CPC ............ *G02B 6/305* (2013.01); *G02B 6/12004* (2013.01); *G02B 6/29344* (2013.01); *G02B 6/3656* (2013.01); *G02B 6/42* (2013.01); *G02B 6/43* (2013.01)

(58) Field of Classification Search
CPC .... G02B 6/12; G02B 6/12004; G02B 6/1228; G02B 6/14; G02B 6/30; G02B 6/305; G02B 6/3636; G02B 6/3652; G02B 6/3656; G02B 6/29344; G02B 6/42; G02B 6/423; G02B 6/4226; G02B 6/4246; G02B 6/4249; G02B 6/43
USPC .............. 385/14, 24, 27, 43, 49–52, 129–132
See application file for complete search history.

(56) References Cited

U.S. PATENT DOCUMENTS

| | | | | |
|---|---|---|---|---|
| 6,839,492 B2* | 1/2005 | Kwon | ...................... | G02B 6/30 385/49 |
| 2003/0174956 A1* | 9/2003 | Viens | .................... | G02B 6/1228 385/43 |
| 2004/0114869 A1* | 6/2004 | Fike | ........................ | G02B 6/124 385/43 |

OTHER PUBLICATIONS

Ku, K., et al., "Wide-Band Optical Mode Converters for Coupling Between Fibers and Silicon Photonic Wires with Large Misalignment Tolerance," Journal of Lightwave Technology, vol. 31, No. 10, May 15, 2013, pp. 1616-1620.

* cited by examiner

*Primary Examiner* — Akm Enayet Ullah
*Assistant Examiner* — Michael Mooney
(74) *Attorney, Agent, or Firm* — Conley Rose, P.C.; Grant Rodolph; Jonathan K. Polk

(57) ABSTRACT

An edge coupling method comprising positioning a first photonic device such that a first edge coupler of the first photonic device is at least partially aligned with a first alignment waveguide of a second photonic device and such that a second edge coupler of the first photonic device is at least partially aligned with a second alignment waveguide of the second photonic device, wherein the first edge coupler widens towards an edge of the first photonic device and the second edge coupler widens towards the edge, and wherein the first edge coupler and the second edge coupler are optically coupled to each other by an interconnect, transmitting a light through the first alignment waveguide, detecting the light at the second alignment waveguide, and aligning the first photonic device and the second photonic device based on the detecting.

20 Claims, 4 Drawing Sheets

OPTICAL ALIGNMENT USING MULTIMODE EDGE COUPLERS

BACKGROUND

Conventional edge-coupled photonic integrated circuits (PICs) (e.g., silicon photonic (SiP) circuits) are designed using single-mode waveguides. Edge coupling is a standard technique for coupling between single-mode fibers and PIC devices such as optical switches, modulators, high-speed detectors, and interposers. Edge coupling offers a broadband response, provides low insertion loss (IL), and couples both transverse electric (TE) modes and transverse magnetic (TM) modes. Coupling efficiency is high when the mode field diameter (MFD) of a fiber and a waveguide are matched and when incoming light and outgoing light are aligned. Coupling efficiency is very sensitive to misalignment, for example, between a fiber and a waveguide. As an example, a 0.5 micrometer (μm) lateral offset of an inverted-taper spot size converter (SSC) reduces a coupled light power output by half. As a result, precision alignment requirements are stringent. Processes such as optoelectronic packaging of PICs are challenging due to those stringent alignment requirements. It is desirable to provide edge coupling alignment between single-mode fibers and PICs with relaxed lateral misalignment tolerances.

SUMMARY

In one embodiment, the disclosure includes an edge coupling method comprising positioning a first photonic device such that a first edge coupler of the first photonic device is at least partially aligned with a first alignment waveguide of a second photonic device and such that a second edge coupler of the first photonic device is at least partially aligned with a second alignment waveguide of the second photonic device, wherein the first edge coupler widens towards an edge of the first photonic device and the second edge coupler widens towards the edge, and wherein the first edge coupler and the second edge coupler are optically coupled to each other by an interconnect, transmitting a light through the first alignment waveguide, detecting the light at the second alignment waveguide, and aligning the first photonic device and the second photonic device based on the detecting.

In another embodiment, the disclosure includes an apparatus comprising an edge, an interconnect comprising a first end and a second end, a first edge coupler optically coupled to the first end and comprising a first tapered waveguide that widens towards the edge, a second edge coupler optically coupled to the second end and comprising a second tapered waveguide that widens towards the edge, and a first single-mode waveguide physically coupled to the edge.

In yet another embodiment, the disclosure includes an apparatus comprising an interconnect, a first edge coupler that widens towards an edge and is optically coupled to the interconnect and configured to receive a light, and allow a fundamental mode of the light and a first-order mode of the light to pass to the interconnect, and a second edge coupler that widens towards the edge and is optically coupled to the interconnect and configured to receive the fundamental mode of the light and the first-order mode of the light from the interconnect, and output the fundamental mode of the light and the first-order mode of the light, and a single-mode waveguide.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

It should be understood at the outset that although an illustrative implementation of one or more embodiments are provided below, the disclosed systems and/or methods may be implemented using any number of techniques, whether currently known or not. The disclosure should in no way be limited to the illustrative implementations, drawings, and techniques illustrated below, but may be modified within the scope of the appended claims along with their full scope of equivalents.

Disclosed herein are various embodiments for a multimode edge coupler and for performing edge coupling alignment using multimode edge couplers. In an embodiment, a multimode edge coupler is an on-chip multimode edge coupler that is dedicated to optical edge coupling alignment, which relaxes lateral misalignment tolerances. The sensitivity to lateral misalignments can be reduced by broadening the MFD of the multimode edge coupler. Broadening the MFD of the multimode edge coupler can be achieved by increasing the in-plane dimension of the waveguide, for example, by tapering the width of the multimode edge coupler to a width much wider than the width of the source beam or input waveguide. In such a configuration, a light source has the potential of exciting the fundamental mode and additional higher-order modes. The number of modes transmitted from a multimode edge coupler into an interconnecting multimode waveguide can be controlled by the design of the taper section. For instance, the number of light modes that are excited can be controlled by changing the width or tapering of a multimode edge coupler. As an example, tapering a multimode edge coupler to about 1 μm will only allow the fundamental mode and the first-order mode and will cut off the second-order mode and higher-order modes. The use of the term about means±10% of the subsequent number, unless otherwise stated.

A photonic device may comprise two multimode edge couplers for edge coupling alignment. The multimode edge couplers may be located at the outermost channels and are dedicated to coarse and fine optical alignment. Multimode edge couplers provide a dedicated optical loopback for coarse optical alignment. The optical power coupled into the optical loopback is used to indicate a lateral offset of photonic devices (e.g., a fiber array and a photonic device) with respect to each other. Edge coupling alignment can be controlled optically or electronically. For example, optical power can be split such that a portion of the optical power is sent to a photodetector to be converted into an electrical signal. The electrical signal can be made available for alignment process control and automation.

Figure 1:
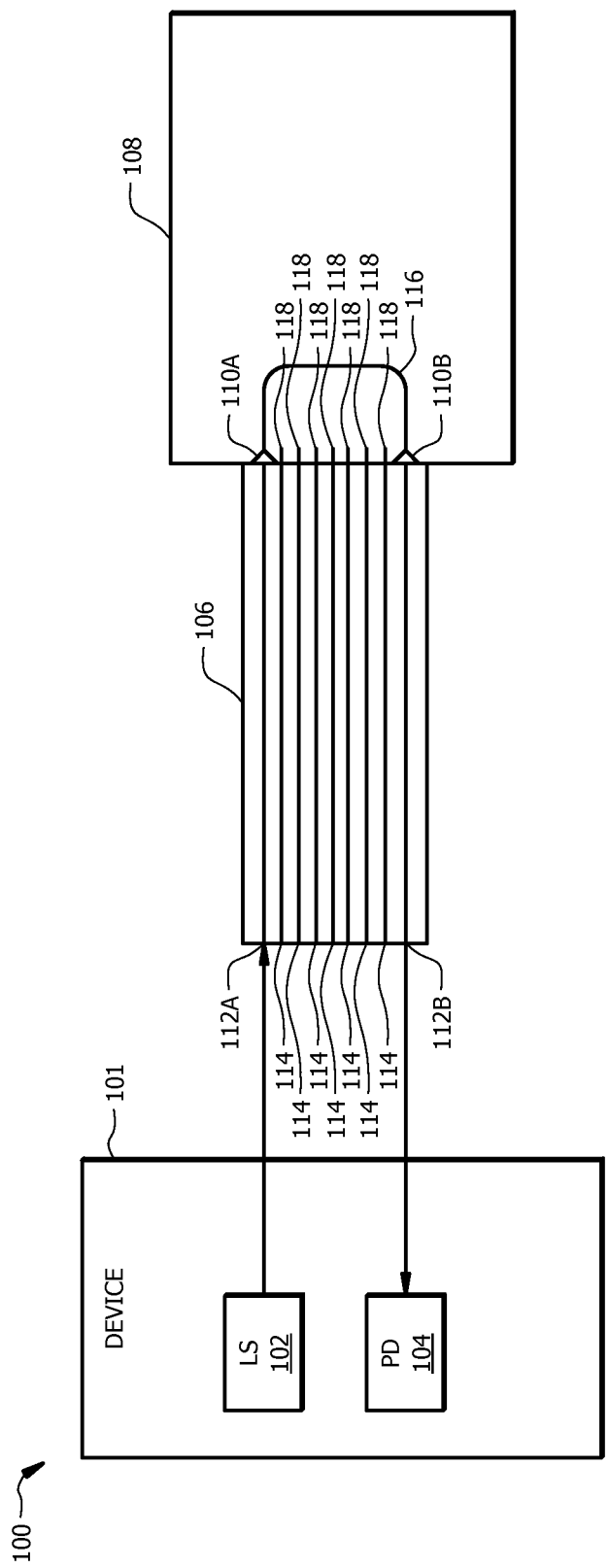
FIG. 1 is a schematic diagram of an embodiment of an optical system.

FIG. 1 is a schematic diagram of an embodiment of an optical system 100. Optical system 100 comprises a device 101, a light source 102, a photodetector 104, a fiber coupler 106, and a PIC 108. Device 101, light source 102, photodetector 104, fiber coupler 106, and PIC 108 may be arranged as shown or in any other suitable configuration. Optical system 100 is configured to determine and adjust a lateral offset between fiber coupler 106 and PIC 108 by sending a light through an optical loopback, measuring the light power output of the light received from the optical loopback, and adjusting the lateral offset between fiber coupler 106 and PIC 108 in accordance with the measured light power output.

Device 101 is configured to output light, to receive light or electrical signals, and to measure and process the light or electrical signals. For example, device 101 is configured to send control signals to light source 102 and automation components and to receive electrical signals from photodetector 104.

In an embodiment, light source 102 is integrated with device 101. Alternatively, light source 102 is external from device 101 and in signal communication with device 101. Light source 102 is configured to generate light and to send the light to photodetector 104 through an optical loopback that traverses fiber coupler 106 and PIC 108. Optionally, light source 102 may also be configured to receive control signals from device 101 that indicates to generate light. For example, light is sent to photodetector 104 along a light path via an alignment waveguide 112A in fiber coupler 106, multimode interconnect 116 in PIC 108, and an alignment waveguide 112B in fiber coupler 106. Examples of light source 102 may include, but are not limited to, a laser and a DFB laser.

Fiber coupler 106 is configured as a fiber array and comprises a plurality of alignment waveguides 112A and 112B and single-mode waveguides 114 that provide light paths across fiber coupler 106. Fiber coupler 106 is configured to communicate light between light source 102 and PIC 108 and between PIC 108 and photodetector 104. Alignment waveguides 112A and 112B may be single-mode waveguides or multimode waveguides. For example, alignment waveguides 112A and 112B are configured to allow only a fundamental mode and higher-order modes to propagate through the waveguide. Single-mode waveguides 114 are configured to allow only a fundamental mode to propagate through the waveguide. Examples of fiber coupler 106 include, but are not limited to, fiber arrays, planar lightwave circuits (PLCs) MFD- or pitch-reducing assemblies, and lensed fibers.

PIC 108 is configured to perform one or more photonic functions on light or an optical signal. For example, PIC 108 may be a semiconductor chip that integrates multiple optical or opto-electrical components. The PIC 108 may include, but is not limited to, an SiP chip. PIC 108 comprises multimode edge couplers 110A and 110B, a plurality of single-mode waveguides 118, and a multimode interconnect 116. Multimode edge coupler 110A is configured to interface with alignment waveguide 112A, single-mode waveguides 118 are configured to interface with single-mode waveguides 114, and multimode edge coupler 110B is configured to interface with alignment waveguide 112B. In another embodiment, single-mode edge couplers may be used instead of multimode edge couplers 110A and 110B.

Photodetector 104 is integrated with device 101. Alternatively, photodetector 104 is external from device 101 and in signal communication with device 101. Photodetector 104 is configured to receive light from light source 102 via the optical loopback and to generate an electrical signal in response to the received light. For example, photodetector 104 may be configured to generate an electrical current that is proportional to the received light output. The photodetector 104 may include, but is not limited to, a photodiode detector.

Figure 2:
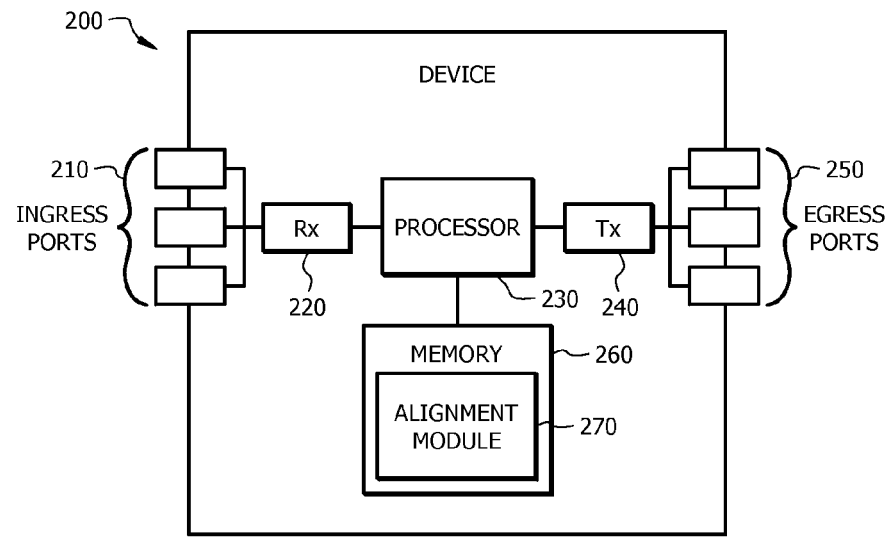
FIG. 2 is a schematic diagram of an embodiment of a device for aligning photonic devices.

FIG. 2 is a schematic diagram of a device 200. The device 200 may be suitable for implementing the disclosed embodiments. For instance, the device 200 may implement device 101 in system 100 and methods 600 and 700. The device 200 comprises ingress ports 210 and receiver units (Rx) 220 to receive data; a processor, logic unit, or central processing unit (CPU) 230 to process the data; transmitter units (Tx) 240 and egress ports 250 to transmit the data; and a memory 260 comprising an alignment module 270 to store data and instructions for implementing embodiments described herein. The device 200 may also comprise electrical-to-optical (EO) components and optical-to-electrical (OE) components coupled to the ingress ports 210, Rx units 220, Tx units 240, and egress ports 250 for egress or ingress of electrical or optical signals.

The processor 230 may be implemented by hardware and software. The processor 230 may be implemented as one or more CPU chips, cores (e.g., as a multi-core processor), field-programmable gate arrays (FPGAs), application specific integrated circuits (ASICs), and digital signal processors (DSPs). The processor 230 is in communication with the ingress ports 210, Rx units 220, Tx units 240, egress ports 250, and memory 260.

The memory 260 comprises one or more disks, tape drives, and solid-state drives and may be used as an over-flow data storage device, to store programs when such programs are selected for execution, and to store instructions and data that are read during program execution. The memory 260 may be volatile and non-volatile and may be read-only memory (ROM), random-access memory (RAM), ternary content-addressable memory (TCAM), and static random-access memory (SRAM). Alignment module 270 is implemented on processor 230 to execute the instructions for implementing various embodiments such as methods 600 and 700.

Figure 3:
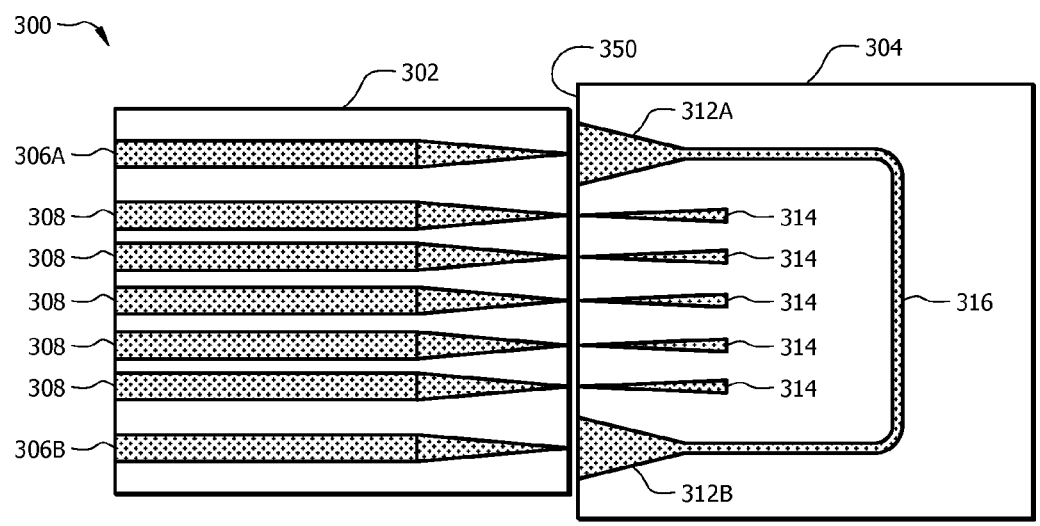
FIG. 3 is a schematic diagram of an embodiment of an interface between photonic devices.

FIG. 3 is a schematic diagram of an embodiment of an interface 300 between photonic devices. For example, interface 300 is an interface between fiber coupler 302 and PIC 304 which may be configured similarly to fiber coupler 106 and PIC 108 in FIG. 1, respectively. Interface 300 illustrates a portion of an optical loopback that comprises a light path along alignment waveguide 306A, multimode edge coupler 312A, multimode interconnect 316, multimode edge coupler 312B, and alignment waveguide 306B. Alignment waveguide 306A, multimode edge coupler 312A, multimode interconnect 306A, multimode edge coupler 312B, and alignment waveguide 306B may be positioned as shown or in any other suitable configuration. For instance, alignment waveguide 306A and alignment waveguide 306B need not be the outermost waveguides in the fiber coupler 302. In another embodiment, similarly configured single mode edge couplers may be used instead of multimode edge couplers 312A and 312B, in which case a single mode interconnect could be used instead of multimode interconnect 316.

Fiber coupler 302 comprises alignment waveguides 306A and 306B and single-mode waveguides 308. Alignment waveguides 306A and 306B and single-mode waveguides 308 are configured similarly to alignment waveguides 112A and 112B and single-mode waveguides 114 in FIG. 1, respectively. For example, alignment waveguide 306A and 306B may be single-mode waveguides or multimode waveguides. Alignment waveguides 306A and 306B and single-mode waveguides 308 are configured as inverse tapered waveguides.

PIC 304 is a substrate comprising multimode edge couplers 312A and 312B, multimode interconnect 316, and single-mode waveguides 314. Multimode edge couplers 312A and 312B and single-mode waveguides 314 are configured similarly to multimode edge couplers 110A and 110B and single-mode waveguides 118 in FIG. 1, respectively. Single-mode waveguides 314 are configured to allow only a fundamental mode of light to be communicated via the single-mode waveguides 314. Single-mode waveguides 314 may be optically coupled to one or more photonic devices (not shown). Multimode edge couplers 312A and 312B are configured as tapered multimode waveguides that widen towards an edge 350 of PIC 304 and coupled to each other via multimode interconnect 316 such that a multimode light is communicated between multimode edge couplers 312A and 312B through multimode interconnect 316. Multimode interconnect 316 is a multimode waveguide. In an embodiment, multimode edge couplers 312A and 312B are tapered to excite and to allow only a fundamental mode of a light and a first-order mode of the light to be communicated via multimode interconnect 316. Taper design allows fundamental and first-order modes of light to propagate into the multimode interconnect 316 and between the multimode edge couplers 312A and 312B, and taper design allows higher-order modes of light to propagate into the cladding (not shown), which is inside PIC 304 and surrounds multimode edge couplers 312A and 312B and multimode interconnect 316. The widths of multimode edge couplers 312A and 312B at the interface between fiber coupler 302 and PIC 304 are significantly wider than the widths of alignment waveguides 306A and 306B, respectively. For example, the multimode edge couplers 312A and 312B may be about 200% to about 400% wider than the tip of alignment waveguides 306A and 306B. The increased widths of multimode edge couplers 312A and 312B allows for coarse alignment of the fiber coupler 302 and the PIC 304. Multimode edge couplers 312A and 312B are able to receive light even when the fiber coupler 302 and the PIC 304 are not perfectly aligned.

To determine the lateral alignment between fiber coupler 302 and PIC 304, light is sent through one of the alignment waveguides (e.g., alignment waveguide 306A), to multimode edge coupler 312A, to multimode interconnect 316, to multimode edge coupler 312B, and to the other alignment waveguide (e.g., alignment waveguide 306B). Light power output loss is significantly reduced when alignment waveguides 306A and 306B are coarsely aligned with multimode edge couplers 312A and 312B, respectively. For example, a light power output may have less than about 0.5 decibel (dB) loss when the fiber coupler 302 and the PIC 304 are aligned to within about +1-1.75 µm. Light power output is attenuated, or reduced, when the alignment waveguides 306A and 306B are not aligned with multimode edge couplers 312A and 312B.

Figure 4:
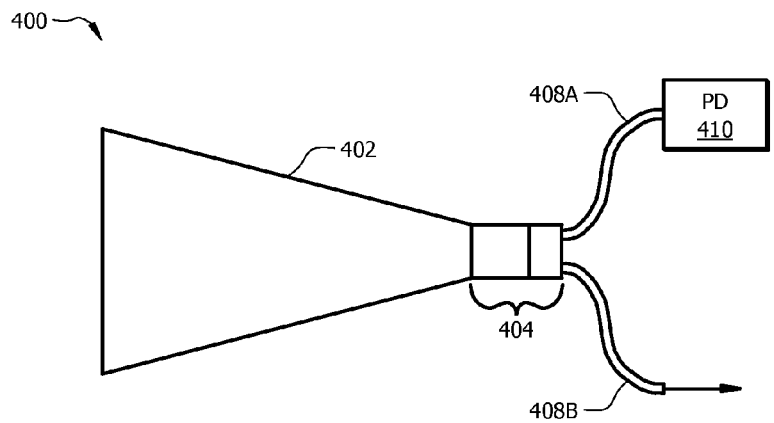
FIG. 4 is a schematic diagram of an embodiment of a multimode edge coupler configuration.

FIG. 4 is a schematic diagram of an embodiment of a multimode edge coupler configuration 400 that is configured to split at least a portion of a light and convert that portion into an electrical signal. The electrical signal or light may be used as control signals, for example, for alignment processes (e.g., edge coupling alignment method 600 in FIG. 6). Multimode edge coupler configuration 400 comprises a multimode edge coupler 402, an adjuster 404, and photodetector 410. Multimode edge coupler configuration 400 may be configured as shown or in any other suitable configuration as would be appreciated by one of ordinary skill in the art.

Multimode edge coupler 402 is a tapered waveguide that is configured to allow only a fundamental mode of a light and a first-order mode of the light to be communicated through multimode edge coupler 402 and to substantially disallow higher-order of modes of the light to be communicated through multimode edge coupler 402. Multimode edge coupler 402 may be configured similarly to multimode edge couplers 312A and 312B in FIG. 3.

Adjuster 404 is a short rib waveguide section configured to adjust the phase shift between a fundamental mode of light and the first-order mode of the light and to split the light for coupling into light paths 408A and 408B. The adjuster 404 may include, but is not limited to, a multimode interference (MMI) splitter or a Y-junction. Adjuster 404 may employ shallow etched shoulders to reduce diffraction and scattering losses. The length of adjuster 404 can be designed to achieve a phase shift of ±

$$\pm \frac{\pi}{2}$$

radians between the fundamental mode and the first-order mode to provide about equal power to light paths coupled to adjuster 404.

Adjuster 404 is configured to distribute light or light power among two or more light paths 408A and 408B. A first portion of light power may be sent to photodetector 410 along a first light path 408A and a second portion of light power may be sent to a second light path 408B. The second light path 408B may be configured similarly to multimode interconnect 316 in FIG. 3. Light power may be distributed between light path 408A and light path 408B using any suitable distribution. For example, a distribution between light path 408A and 408B may be about 100% and about 0%, about 99% and about 1%, about 90% and about 10%, about 50% and about 50%, about 10% and about 90%, about 1% and about 99%, or about 0% and about 100%, respectively.

Photodetector 410 is configured to receive light from light path 408A and to generate an electrical signal in response to the received light power. For example, photodetector 410 may be configured to generate an electrical current that is proportional to the received light power. The photodetector 410 may include, but is not limited to, a photodiode detector.

Figure 5:
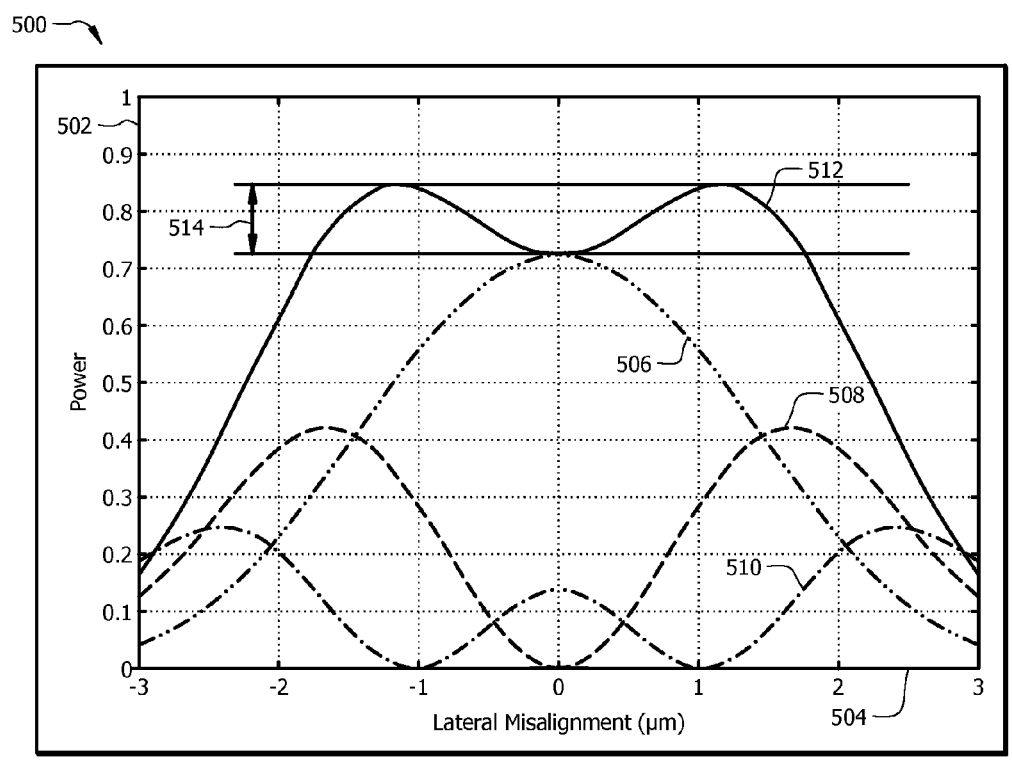
FIG. 5 is a graph of lateral misalignment versus light power output.

FIG. 5 is a graph 500 of an embodiment of lateral misalignment versus light power coupled into an alignment waveguide, for example, alignment waveguides 306A and 306B in FIG. 3, and a multimode edge coupler, for example, multimode edge couplers 312A and 312B in FIG. 3. Axis 502 indicates coupled light power in relative units for a fundamental mode, a first-mode, and a second-mode of light and axis 504 indicates a relative lateral misalignment or offset (e.g., an offset in µm) between an alignment waveguide and a multimode edge coupler. Curve 506 is the light power output of a fundamental mode for a light. Curve 508 is the light power output of a first-order mode for the light. Curve 510 is the light power output of a second-order mode for the light. Curve 512 is the light power output from combining the fundamental mode and the first-order mode for the light.

As shown by curve 512, combining the fundamental mode and the first-order mode for the light results in a relatively flat-top curve. A flat-top curve provides a smaller range of light power variation 514 over a range of lateral misalignments when compared to the light power output of the fundamental mode or any other order modes individually. For example, curve 512 has a light power variation of about 0.1 from a lateral misalignment of about −1.75 μm to about 1.75 μm. Combining the fundamental mode and the first-order mode generates a flat-top curve that simplifies aligning a single-mode or multimode fiber and a multimode edge coupler, for example, compared to using a Gaussian curve. As also shown by curve 512, lateral misalignment reduces as light power increases, and lateral misalignment is maximized between two maxima of light power.

Figure 6:
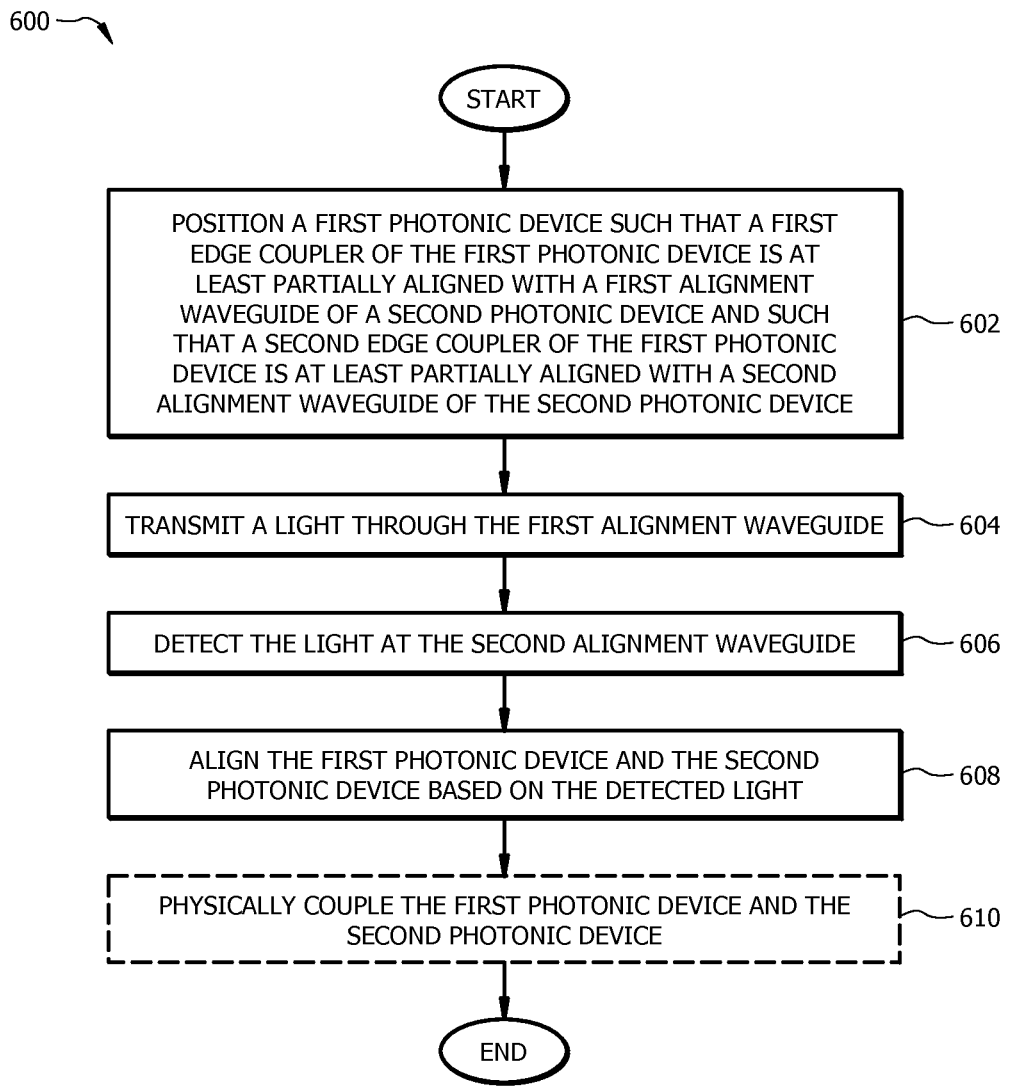
FIG. 6 is a flowchart of an embodiment of an edge coupling alignment method.

FIG. 6 is a flowchart of an embodiment of an edge coupling alignment method 600 for aligning photonic devices in an optical system. For example, an optical system may be configured similarly to optical system 100 in FIG. 1. Method 600 can be implemented by an operator to align photonic devices, for example, for testing photonic devices or for assembling or packaging a product. Alternatively, method 600 can be implemented autonomously using a control system.

At step 602, a first photonic device comprising a first multimode edge coupler, a second multimode edge coupler, and at least one single mode waveguide is positioned such that the first multimode edge coupler of the first photonic device is at least partially aligned with a first alignment waveguide of a second photonic device and such that the second multimode edge coupler of the first photonic device is at least partially aligned with a second alignment waveguide of the second photonic device. As such, the first photonic device and the second photonic device are coarsely aligned. The multimode edge couplers and the alignment waveguides may or may not be perfectly aligned.

At step 604, a light is transmitted through the first alignment waveguide. For example, a light source or a device comprising a light source is optically coupled to the first alignment waveguide and is configured to transmit light through the first alignment waveguide.

At step 606, the light is detected at the second alignment waveguide. For example, a photodetector or a device comprising a photodetector is optically coupled to the second alignment waveguide and is configured to detect light from the second alignment waveguide and to determine a light power output of the detected light.

At step 608, the first photonic device and the second photonic device are finely aligned based on the detected light. The alignment or lateral offset between the first photonic device and the second photonic device may be finely adjusted to position the photonic devices such that the light power output loss is significantly reduced. For instance, a control system may adjust the lateral offset of second photonic device with respect to the first photonic device based on the detected light from the alignment waveguide until the light power output loss is significantly reduced. Alternatively, the control system may adjust the lateral offset until a specified light power output is obtained. For instance, the light power output may be a percentage of the input light power. An electrical signal may be generated in response to the detected light and the electrical signal may be used to adjust the lateral offset between the first photonic device and the second photonic device, for example, when one of the multimode edge couplers is configured similarly to multimode edge coupler configuration 400 in FIG. 4. The electrical signal indicates a measured amount of light power output.

Optionally, at step 610, the first photonic device and the second photonic device may be coupled to each other following their edge coupling alignment. For example, the first photonic device and the second photonic device may be coupled together using an adhesive, an epoxy, a solder joint, or any other suitable bonding technique as would be appreciated by one of ordinary skill in the art upon viewing this disclosure.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. An edge coupling method comprising:
   positioning a first photonic device such that a first edge coupler of the first photonic device is at least partially aligned with a first alignment waveguide of a second photonic device and such that a second edge coupler of the first photonic device is at least partially aligned with a second alignment waveguide of the second photonic device, wherein the first edge coupler widens towards an edge of the first photonic device and the second edge coupler widens towards the edge, and wherein the first edge coupler and the second edge coupler are optically coupled to each other by an interconnect;
   transmitting a light through the first alignment waveguide;
   detecting the light at the second alignment waveguide; and
   aligning the first photonic device and the second photonic device based on the detecting.

2. The method of claim 1, wherein the first edge coupler and the second edge coupler are configured to excite a fundamental mode and a first-order mode for the light.

3. The method of claim 1, wherein the first edge coupler and the second edge coupler are configured to not excite a second-order mode for the light or a higher-order mode for the light.

4. The method of claim 1, wherein the first photonic device comprises at least one single-mode waveguide, and wherein the second photonic device comprises at least one single-mode waveguide.

5. The method of claim 1, wherein detecting the light comprises determining a light power output for the light.

6. The method of claim 1, wherein aligning the first photonic device and the second photonic device comprises positioning the first photonic device and the second photonic device to reduce a light power output loss for the light.

7. The method of claim 1, wherein aligning the first photonic device and the second photonic device comprises adjusting a lateral offset between the first photonic device and the second photonic device.

8. The method of claim 1, wherein the first alignment waveguide and the second alignment waveguide are multimode waveguides.

9. The method of claim 1, wherein the first alignment waveguide and the second alignment waveguide are single-mode waveguides.

10. An apparatus comprising:
an edge;
an interconnect comprising a first end and a second end;
a first edge coupler optically coupled to the first end and comprising a first tapered waveguide that widens towards the edge;
a second edge coupler optically coupled to the second end and comprising a second tapered waveguide that widens towards the edge; and
a first single-mode waveguide physically coupled to the edge.

11. The apparatus of claim 10, wherein the first single-mode waveguide comprises an endpoint coupled to the edge, and wherein the endpoint is positioned between the first edge coupler and the second edge coupler.

12. The apparatus of claim 11, wherein the first edge coupler and the second edge coupler are configured to excite a fundamental mode for a light and a first-order mode for the light.

13. The apparatus of claim 11, wherein the first edge coupler and the second edge coupler are configured to not excite a second-order mode for a light or higher-order modes for the light.

14. The apparatus of claim 11, further comprising:
an adjuster coupled to the first edge coupler, wherein a first output of the adjuster optically couples the first edge coupler to the interconnect; and
a light path optically coupled to a second output of the adjuster, wherein the light path diverts at least a portion of a light from the interconnect.

15. The apparatus of claim 14, further comprising a photodetector optically coupled to the light path, wherein the photodetector is configured to generate an electrical signal in response to detecting the light.

16. The apparatus of claim 14, wherein the adjuster comprises a multimode interference (MMI) splitter, and wherein the MMI splitter is configured to adjust a phase shift between a fundamental mode of the light and a first-order mode of the light.

17. The apparatus of claim 11, further comprising a fiber array that comprises a second single-mode waveguide, a first alignment waveguide, and a second alignment waveguide, wherein the first alignment waveguide is optically coupled to the first edge coupler, and wherein the second alignment waveguide is optically coupled to the second edge coupler.

18. An apparatus comprising:
an interconnect;
a first edge coupler that widens towards an edge and is optically coupled to the interconnect and configured to:
receive a light; and
allow a fundamental mode of the light and a first-order mode of the light to pass to the interconnect; and
a second edge coupler that widens towards the edge and is optically coupled to the interconnect and configured to:
receive the fundamental mode of the light and the first-order mode of the light from the interconnect; and
output the fundamental mode of the light and the first-order mode of the light; and
a single-mode waveguide.

19. The apparatus of claim 18, wherein the single-mode waveguide comprises an endpoint coupled to an edge, and wherein the endpoint is positioned between the first edge coupler and the second edge coupler.

20. The apparatus of claim 18, further comprising:
an adjuster optically coupled to the first edge coupler and comprising a first output and a second output, wherein the first output optically couples the first edge coupler to the interconnect; and
a light path optically coupled to the second output, wherein the light path diverts at least a portion of the fundamental mode of the light and the first-order mode of the light away from the interconnect.

* * * * *